US011679330B2

(12) United States Patent
Eatedali et al.

(10) Patent No.: US 11,679,330 B2
(45) Date of Patent: Jun. 20, 2023

(54) SYSTEMS AND METHODS FOR GENERATING IMPROVED NON-PLAYER CHARACTERS

(71) Applicant: Activision Publishing, Inc., Santa Monica, CA (US)

(72) Inventors: Josiah Eatedali, Los Angeles, CA (US); Mario Joseph Giombi, Middleton, WI (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 16/718,571

(22) Filed: Dec. 18, 2019

(65) Prior Publication Data
US 2020/0197811 A1  Jun. 25, 2020

Related U.S. Application Data

(60) Provisional application No. 62/781,568, filed on Dec. 18, 2018.

(51) Int. Cl.
*A63F 13/57* (2014.01)
*G06N 3/02* (2006.01)
(Continued)

(52) U.S. Cl.
CPC ............ *A63F 13/57* (2014.09); *A63F 13/335* (2014.09); *G06N 3/02* (2013.01); *G06N 20/00* (2019.01)

(58) Field of Classification Search
CPC ....... A63F 13/57; A63F 13/335; G06N 20/00; G06N 3/02
See application file for complete search history.

(56) References Cited

U.S. PATENT DOCUMENTS

| 4,461,301 A | 7/1984 | Ochs |
|---|---|---|
| 4,908,761 A | 3/1990 | Tai |

(Continued)

FOREIGN PATENT DOCUMENTS

| AU | 768367 | 3/2004 |
|---|---|---|
| AU | 2005215048 | 10/2011 |

(Continued)

OTHER PUBLICATIONS

Ma et al., "A Scalable Parallel Cell-Projection Volume Rendering Algorithm for Three-Dimensional Unstructured Data", IEEE 1997, pp. 1-10.

(Continued)

*Primary Examiner* — Malina D. Blaise
(74) *Attorney, Agent, or Firm* — Novel IP

(57) ABSTRACT

The disclosed systems and methods track and continuously monitor data about a player or a multiple players and create a non-playing character (NPC) and/or modify an existing NPC that replicates the player(s) play style. The disclosed systems implement an artificial intelligence engine that monitors how a real player responds to one or more events in a game and correlates game outcomes with real player actions, with the actions or reactions of third players, and/or with an amount or extent of engagement. The engine may be used to generate, host, or otherwise provide data representative of one or more NPCs to multiple different games, being hosted by one or more servers, concurrently.

16 Claims, 4 Drawing Sheets

(51) Int. Cl.
  *G06N 20/00* (2019.01)
  *A63F 13/335* (2014.01)

(56) References Cited

U.S. PATENT DOCUMENTS

| | | |
|---|---|---|
| 5,031,089 A | 7/1991 | Liu |
| 5,058,180 A | 10/1991 | Khan |
| 5,365,360 A | 11/1994 | Torres |
| 5,371,673 A | 12/1994 | Fan |
| 5,432,934 A | 7/1995 | Levin |
| 5,442,569 A | 8/1995 | Osano |
| 5,493,692 A | 2/1996 | Theimer |
| 5,497,186 A | 3/1996 | Kawasaki |
| 5,530,796 A | 6/1996 | Wang |
| 5,539,883 A | 7/1996 | Allon |
| 5,561,736 A | 10/1996 | Moore |
| 5,563,946 A | 10/1996 | Cooper |
| 5,606,702 A | 2/1997 | Diel |
| 5,630,129 A | 5/1997 | Wheat |
| 5,685,775 A | 11/1997 | Bakoglu |
| 5,694,616 A | 12/1997 | Johnson |
| 5,706,507 A | 1/1998 | Schloss |
| 5,708,764 A | 1/1998 | Borrel |
| 5,726,883 A | 3/1998 | Levine |
| 5,736,985 A | 4/1998 | Lection |
| 5,736,990 A | 4/1998 | Barrus |
| 5,737,416 A | 4/1998 | Cooper |
| 5,745,113 A | 4/1998 | Jordan |
| 5,745,678 A | 4/1998 | Herzberg |
| 5,758,079 A | 5/1998 | Ludwig |
| 5,761,083 A | 6/1998 | Brown |
| 5,762,552 A | 6/1998 | Vuong |
| 5,768,511 A | 6/1998 | Galvin |
| 5,774,668 A | 6/1998 | Choquier |
| 5,793,365 A | 8/1998 | Tang |
| 5,825,877 A | 10/1998 | Dan |
| 5,828,839 A | 10/1998 | Moncreiff |
| 5,835,692 A | 11/1998 | Cragun |
| 5,860,137 A | 1/1999 | Raz |
| 5,877,763 A | 3/1999 | Berry |
| 5,878,233 A | 3/1999 | Schloss |
| 5,880,731 A | 3/1999 | Liles |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,920,692 A | 7/1999 | Nguyen |
| 5,920,848 A | 7/1999 | Schutzer |
| 5,923,324 A | 7/1999 | Berry |
| 5,926,100 A | 7/1999 | Escolar |
| 5,933,818 A | 8/1999 | Kasravi |
| 5,938,722 A | 8/1999 | Johnson |
| 5,958,014 A | 9/1999 | Cave |
| 5,969,724 A | 10/1999 | Berry |
| 5,977,979 A | 11/1999 | Clough |
| 5,983,003 A | 11/1999 | Lection |
| 5,990,887 A | 11/1999 | Redpath |
| 5,990,888 A | 11/1999 | Blades |
| 6,006,223 A | 12/1999 | Agrawal |
| 6,008,848 A | 12/1999 | Tiwari |
| 6,009,455 A | 12/1999 | Doyle |
| 6,012,096 A | 1/2000 | Link |
| 6,014,145 A | 1/2000 | Bardon |
| 6,018,734 A | 1/2000 | Zhang |
| 6,021,268 A | 2/2000 | Johnson |
| 6,021,496 A | 2/2000 | Dutcher |
| 6,023,729 A | 2/2000 | Samuel |
| 6,025,839 A | 2/2000 | Schell |
| 6,032,129 A | 2/2000 | Greef |
| 6,049,819 A | 4/2000 | Buckle |
| 6,058,266 A | 5/2000 | Megiddo |
| 6,059,842 A | 5/2000 | Dumarot |
| 6,061,722 A | 5/2000 | Lipa |
| 6,067,355 A | 5/2000 | Lim |
| 6,069,632 A | 5/2000 | Mullaly |
| 6,070,143 A | 5/2000 | Barney |
| 6,076,093 A | 6/2000 | Pickering |
| 6,081,270 A | 6/2000 | Berry |
| 6,081,271 A | 6/2000 | Bardon |
| 6,088,727 A | 7/2000 | Hosokawa |
| 6,088,732 A | 7/2000 | Smith |
| 6,091,410 A | 7/2000 | Lection |
| 6,094,196 A | 7/2000 | Berry |
| 6,098,056 A | 8/2000 | Rusnak |
| 6,101,538 A | 8/2000 | Brown |
| 6,104,406 A | 8/2000 | Berry |
| 6,108,420 A | 8/2000 | Larose |
| 6,111,581 A | 8/2000 | Berry |
| 6,115,718 A | 9/2000 | Huberman |
| 6,134,588 A | 10/2000 | Guenthner |
| 6,138,128 A | 10/2000 | Perkowitz |
| 6,141,699 A | 10/2000 | Luzzi |
| 6,144,381 A | 11/2000 | Lection |
| 6,148,294 A | 11/2000 | Beyda |
| 6,148,328 A | 11/2000 | Cuomo |
| 6,157,953 A | 12/2000 | Chang |
| 6,177,932 B1 | 1/2001 | Galdes |
| 6,179,713 B1 | 1/2001 | James |
| 6,182,067 B1 | 1/2001 | Presnell |
| 6,185,614 B1 | 2/2001 | Cuomo |
| 6,195,657 B1 | 2/2001 | Rucker |
| 6,199,067 B1 | 3/2001 | Geller |
| 6,201,881 B1 | 3/2001 | Masuda |
| 6,212,494 B1 | 4/2001 | Boguraev |
| 6,212,548 B1 | 4/2001 | Desimone |
| 6,216,098 B1 | 4/2001 | Clancey |
| 6,222,551 B1 | 4/2001 | Schneider |
| 6,226,686 B1 | 5/2001 | Rothschild |
| 6,233,583 B1 | 5/2001 | Hoth |
| 6,249,779 B1 | 6/2001 | Hitt |
| 6,266,649 B1 | 7/2001 | Linden |
| 6,271,842 B1 | 8/2001 | Bardon |
| 6,271,843 B1 | 8/2001 | Lection |
| 6,275,820 B1 | 8/2001 | Navin-Chandra |
| 6,282,547 B1 | 8/2001 | Hirsch |
| 6,293,865 B1 | 9/2001 | Kelly |
| 6,301,609 B1 | 10/2001 | Aravamudan et al. |
| 6,308,208 B1 | 10/2001 | Jung |
| 6,311,206 B1 | 10/2001 | Malkin |
| 6,314,465 B1 | 11/2001 | Paul |
| 6,330,281 B1 | 12/2001 | Mann |
| 6,334,127 B1 | 12/2001 | Bieganski |
| 6,334,141 B1 | 12/2001 | Varma |
| 6,336,134 B1 | 1/2002 | Varma |
| 6,337,700 B1 | 1/2002 | Kinoe |
| 6,345,264 B1 | 2/2002 | Breese |
| 6,345,287 B1 | 2/2002 | Fong |
| 6,349,091 B1 | 2/2002 | Li |
| 6,351,775 B1 | 2/2002 | Yu |
| 6,353,449 B1 | 3/2002 | Gregg |
| 6,356,297 B1 | 3/2002 | Cheng |
| 6,360,254 B1 | 3/2002 | Linden |
| 6,363,174 B1 | 3/2002 | Lu |
| 6,370,560 B1 | 4/2002 | Robertazzi |
| 6,396,513 B1 | 5/2002 | Helfman |
| 6,411,312 B1 | 6/2002 | Sheppard |
| 6,418,424 B1 | 7/2002 | Hoffberg |
| 6,418,462 B1 | 7/2002 | Xu |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,463,078 B1 | 10/2002 | Engstrom |
| 6,466,550 B1 | 10/2002 | Foster |
| 6,469,712 B1 | 10/2002 | Hilpert, Jr. |
| 6,473,085 B1 | 10/2002 | Brock |
| 6,473,103 B1 | 10/2002 | Bailey |
| 6,473,597 B1 | 10/2002 | Johnson |
| 6,476,830 B1 | 11/2002 | Farmer |
| 6,499,053 B1 | 12/2002 | Marquette |
| 6,501,834 B1 | 12/2002 | Milewski |
| 6,505,208 B1 | 1/2003 | Kanevsky |

(56) References Cited

U.S. PATENT DOCUMENTS

| | | |
|---|---|---|
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,559,863 B1 | 5/2003 | Megiddo |
| 6,567,109 B1 | 5/2003 | Todd |
| 6,567,813 B1 | 5/2003 | Zhu |
| 6,574,477 B1 | 6/2003 | Rathunde |
| 6,580,981 B1 | 6/2003 | Masood |
| 6,594,673 B1 | 7/2003 | Smith |
| 6,601,084 B1 | 7/2003 | Bhaskaran |
| 6,618,751 B1 | 9/2003 | Challenger |
| 6,640,230 B1 | 10/2003 | Alexander |
| 6,641,481 B1 | 11/2003 | Mai |
| 6,645,153 B2 | 11/2003 | Kroll |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,742,032 B1 | 5/2004 | Castellani |
| 6,765,596 B2 | 7/2004 | Lection |
| 6,781,607 B1 | 8/2004 | Benham |
| 6,801,930 B1 | 10/2004 | Dionne |
| 6,807,562 B1 | 10/2004 | Pennock |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,854,007 B1 | 2/2005 | Hammond |
| 6,886,026 B1 | 4/2005 | Hanson |
| 6,901,379 B1 | 5/2005 | Balter |
| 6,941,236 B2 | 9/2005 | Huelsbergen |
| 6,948,168 B1 | 9/2005 | Kuprionas |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |
| 7,028,296 B2 | 4/2006 | Irfan |
| 7,031,473 B2 | 4/2006 | Morais |
| 7,050,868 B1 | 5/2006 | Graepel |
| 7,062,533 B2 | 6/2006 | Brown |
| 7,089,266 B2 | 8/2006 | Stolte |
| 7,124,071 B2 | 10/2006 | Rich |
| 7,124,164 B1 | 10/2006 | Chemtob |
| 7,139,792 B1 | 11/2006 | Mishra |
| 7,143,409 B2 | 11/2006 | Herrero |
| 7,159,217 B2 | 1/2007 | Pulsipher |
| 7,185,067 B1 | 2/2007 | Viswanath |
| 7,192,352 B2 | 3/2007 | Walker |
| 7,209,137 B2 | 4/2007 | Brokenshire |
| 7,230,616 B2 | 6/2007 | Taubin |
| 7,240,093 B1 | 7/2007 | Danieli |
| 7,249,123 B2 | 7/2007 | Elder |
| 7,263,511 B2 | 8/2007 | Bodin |
| 7,278,108 B2 | 10/2007 | Duarte |
| 7,287,053 B2 | 10/2007 | Bodin |
| 7,292,870 B2 | 11/2007 | Heredia |
| 7,305,438 B2 | 12/2007 | Christensen |
| 7,308,476 B2 | 12/2007 | Mannaru |
| 7,314,411 B2 | 1/2008 | Lannert |
| 7,328,242 B1 | 2/2008 | McCarthy |
| 7,353,295 B1 | 4/2008 | Crow |
| 7,376,474 B2 | 5/2008 | Graepel |
| 7,383,307 B2 | 6/2008 | Kirkland |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,509,388 B2 | 3/2009 | Allen |
| 7,515,136 B1 | 4/2009 | Kanevsky |
| 7,525,964 B2 | 4/2009 | Astley |
| 7,527,191 B2 | 5/2009 | Takayama |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,590,984 B2 | 9/2009 | Kaufman |
| 7,596,596 B2 | 9/2009 | Chen |
| 7,614,955 B2 | 11/2009 | Farnham |
| 7,617,283 B2 | 11/2009 | Aaron |
| 7,640,587 B2 | 12/2009 | Fox |
| 7,667,701 B2 | 2/2010 | Leah |
| 7,677,970 B2 | 3/2010 | O'Kelley, II |
| 7,698,656 B2 | 4/2010 | Srivastava |
| 7,702,730 B2 | 4/2010 | Spataro |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,770,114 B2 | 8/2010 | Sriprakash |
| 7,773,087 B2 | 8/2010 | Fowler |
| 7,774,407 B2 | 8/2010 | Daly |
| 7,780,525 B2 | 8/2010 | Walker |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,844,673 B2 | 11/2010 | Bostick |
| 7,846,024 B2 | 12/2010 | Graepel |
| 7,847,799 B2 | 12/2010 | Taubin |
| 7,853,594 B2 | 12/2010 | Elder |
| 7,856,469 B2 | 12/2010 | Chen |
| 7,865,393 B2 | 1/2011 | Leason |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,955,171 B2 | 6/2011 | Jorasch |
| 7,970,837 B2 | 6/2011 | Lyle |
| 7,970,840 B2 | 6/2011 | Cannon |
| 7,985,132 B2 | 7/2011 | Walker |
| 7,985,138 B2 | 7/2011 | Acharya |
| 7,990,387 B2 | 8/2011 | Hamilton, II |
| 7,996,164 B2 | 8/2011 | Hamilton, II |
| 7,997,987 B2 | 8/2011 | Johnson |
| 8,001,161 B2 | 8/2011 | George |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |

(56) References Cited

U.S. PATENT DOCUMENTS

| | | |
|---|---|---|
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,313,364 B2 | 11/2012 | Reynolds |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,489,925 B1 | 7/2013 | Antukh |
| 8,496,531 B2 | 7/2013 | Youm |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,696,465 B2 | 4/2014 | Gatto |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,795,887 B2 | 10/2017 | Lin |
| 9,808,722 B2 | 11/2017 | Kawachiya |
| 9,827,488 B2 | 11/2017 | Pearce |
| 9,942,013 B2 | 4/2018 | Malladi |
| 10,118,099 B2 | 11/2018 | Condrey |
| 10,402,731 B1 * | 9/2019 | Cosic ............... A63F 13/55 |
| 2001/0025253 A1 | 9/2001 | Heintz |
| 2001/0032240 A1 | 10/2001 | Malone |
| 2001/0049301 A1 | 12/2001 | Masuda |
| 2002/0002514 A1 | 1/2002 | Kamachi |
| 2002/0007319 A1 | 1/2002 | Yu |
| 2002/0026388 A1 | 2/2002 | Roebuck |
| 2002/0035480 A1 | 3/2002 | Gordon |
| 2002/0035593 A1 | 3/2002 | Salim |
| 2002/0043568 A1 | 4/2002 | Hess |
| 2002/0065870 A1 | 5/2002 | Baehr-Jones |
| 2002/0090995 A1 | 7/2002 | Haga |
| 2002/0095586 A1 | 7/2002 | Doyle |
| 2002/0096831 A1 | 7/2002 | Nakayama |
| 2002/0097856 A1 | 7/2002 | Wullert |
| 2002/0116466 A1 | 8/2002 | Trevithick |
| 2002/0124137 A1 | 9/2002 | Ulrich |
| 2002/0130904 A1 | 9/2002 | Becker |
| 2002/0135618 A1 | 9/2002 | Maes |
| 2002/0169665 A1 | 11/2002 | Hughes |
| 2002/0184373 A1 | 12/2002 | Maes |
| 2002/0184391 A1 | 12/2002 | Phillips |
| 2002/0188688 A1 | 12/2002 | Bice |
| 2003/0008712 A1 | 1/2003 | Poulin |
| 2003/0014297 A1 | 1/2003 | Kaufman |
| 2003/0032476 A1 | 2/2003 | Walker |
| 2003/0050977 A1 | 3/2003 | Puthenkulam |
| 2003/0055892 A1 | 3/2003 | Huitema |
| 2003/0056002 A1 | 3/2003 | Trethewey |
| 2003/0076353 A1 | 4/2003 | Blackstock |
| 2003/0101343 A1 | 5/2003 | Eaton |
| 2003/0112952 A1 | 6/2003 | Brown |
| 2003/0135621 A1 | 7/2003 | Romagnoli |

(56) References Cited

U.S. PATENT DOCUMENTS

| | | |
|---|---|---|
| 2003/0141977 A1 | 7/2003 | Brown |
| 2003/0145128 A1 | 7/2003 | Baird |
| 2003/0149675 A1 | 8/2003 | Ansari |
| 2003/0158827 A1 | 8/2003 | Ansari |
| 2003/0177187 A1 | 9/2003 | Levine |
| 2003/0195957 A1 | 10/2003 | Banginwar |
| 2003/0210265 A1 | 11/2003 | Haimberg |
| 2004/0014514 A1 | 1/2004 | Yacenda |
| 2004/0054667 A1 | 3/2004 | Kake |
| 2004/0059781 A1 | 3/2004 | Yoakum |
| 2004/0078432 A1 | 4/2004 | Manber |
| 2004/0078596 A1 | 4/2004 | Kent |
| 2004/0088303 A1 | 5/2004 | Elder |
| 2004/0097287 A1 | 5/2004 | Postrel |
| 2004/0103079 A1 | 5/2004 | Tokusho |
| 2004/0113756 A1 | 6/2004 | Mollenkopf |
| 2004/0127277 A1 | 7/2004 | Walker |
| 2004/0128181 A1 | 7/2004 | Zurko |
| 2004/0172339 A1 | 9/2004 | Snelgrove |
| 2004/0174392 A1 | 9/2004 | Bjoernsen |
| 2004/0186886 A1 | 9/2004 | Galli et al. |
| 2004/0205134 A1 | 10/2004 | Digate |
| 2004/0210627 A1 | 10/2004 | Kroening |
| 2004/0228291 A1 | 11/2004 | Huslak |
| 2004/0244006 A1 | 12/2004 | Kaufman |
| 2004/0260771 A1 | 12/2004 | Gusler et al. |
| 2005/0015571 A1 | 1/2005 | Kaufman |
| 2005/0021484 A1 | 1/2005 | Bodin |
| 2005/0027696 A1 | 2/2005 | Swaminathan |
| 2005/0043097 A1 | 2/2005 | March |
| 2005/0050137 A1 | 3/2005 | Bodin |
| 2005/0060368 A1 | 3/2005 | Wang |
| 2005/0071428 A1 | 3/2005 | Khakoo |
| 2005/0071462 A1 | 3/2005 | Bodin |
| 2005/0080859 A1 | 4/2005 | Lake |
| 2005/0085296 A1 | 4/2005 | Gelb |
| 2005/0091380 A1 | 4/2005 | Gonen |
| 2005/0097440 A1 | 5/2005 | Lusk |
| 2005/0113164 A1 | 5/2005 | Buecheler |
| 2005/0132009 A1 | 6/2005 | Solie |
| 2005/0138108 A1 | 6/2005 | Galvin |
| 2005/0149620 A1 | 7/2005 | Kirkland |
| 2005/0161878 A1 | 7/2005 | Nally |
| 2005/0165893 A1 | 7/2005 | Feinberg |
| 2005/0216346 A1 | 9/2005 | Kusumoto |
| 2005/0223075 A1 | 10/2005 | Swearingen et al. |
| 2005/0246711 A1 | 11/2005 | Berstis |
| 2005/0277472 A1 | 12/2005 | Gillan |
| 2006/0003305 A1 | 1/2006 | Kelmar |
| 2006/0004659 A1 | 1/2006 | Hutchison |
| 2006/0026253 A1 | 2/2006 | Kessen |
| 2006/0031322 A1 | 2/2006 | Kessen |
| 2006/0031326 A1 | 2/2006 | Ovenden |
| 2006/0036688 A1 | 2/2006 | McMahan |
| 2006/0080702 A1 | 4/2006 | Diez |
| 2006/0121990 A1 | 6/2006 | O'Kelley |
| 2006/0128460 A1 | 6/2006 | Muir |
| 2006/0129643 A1 | 6/2006 | Nielson |
| 2006/0155813 A1 | 7/2006 | Dietz et al. |
| 2006/0160589 A1 | 7/2006 | Okada |
| 2006/0161852 A1 | 7/2006 | Chen |
| 2006/0178968 A1 | 8/2006 | Jung |
| 2006/0184260 A1 | 8/2006 | Graepel |
| 2006/0190591 A1 | 8/2006 | Bobde |
| 2006/0252526 A1 | 11/2006 | Walker |
| 2006/0258463 A1 | 11/2006 | Cugno |
| 2007/0026934 A1 | 2/2007 | Herbrich |
| 2007/0066403 A1 | 3/2007 | Conkwright |
| 2007/0073582 A1 | 3/2007 | Jung |
| 2007/0087799 A1 | 4/2007 | Van Luchene |
| 2007/0106526 A1 | 5/2007 | Jung |
| 2007/0111789 A1 | 5/2007 | Van Deursen |
| 2007/0112624 A1 | 5/2007 | Jung |
| 2007/0112706 A1 | 5/2007 | Herbrich |
| 2007/0117623 A1 | 5/2007 | Nelson |
| 2007/0117636 A1 | 5/2007 | Takahashi |
| 2007/0130001 A1 | 6/2007 | Jung |
| 2007/0168444 A1 | 7/2007 | Chen |
| 2007/0168447 A1 | 7/2007 | Chen |
| 2007/0173323 A1 | 7/2007 | Johnson |
| 2007/0180040 A1 | 8/2007 | Etgen |
| 2007/0218997 A1 | 9/2007 | Cho |
| 2007/0260567 A1* | 11/2007 | Funge ............... A63F 13/67 706/47 |
| 2007/0265718 A1 | 11/2007 | Graepel |
| 2007/0281285 A1 | 12/2007 | Jayaweera |
| 2007/0298867 A1 | 12/2007 | Huang |
| 2008/0019353 A1 | 1/2008 | Foote |
| 2008/0059304 A1 | 3/2008 | Kimsey |
| 2008/0064467 A1 | 3/2008 | Reiner |
| 2008/0113815 A1 | 5/2008 | Weingardt |
| 2008/0120558 A1 | 5/2008 | Nathan |
| 2008/0126350 A1 | 5/2008 | Shoemaker |
| 2008/0155019 A1 | 6/2008 | Wallace |
| 2008/0176655 A1 | 7/2008 | James |
| 2008/0207329 A1 | 8/2008 | Wallace |
| 2008/0214287 A1 | 9/2008 | Lutnick |
| 2008/0242420 A1 | 10/2008 | Graepel |
| 2008/0254893 A1 | 10/2008 | Patel |
| 2008/0268943 A1 | 10/2008 | Jacob |
| 2008/0270605 A1 | 10/2008 | Berstis |
| 2008/0270916 A1 | 10/2008 | Chen |
| 2008/0274805 A1 | 11/2008 | Ganz |
| 2008/0301405 A1 | 12/2008 | Kaufman |
| 2009/0005172 A1 | 1/2009 | Shibahara |
| 2009/0075738 A1 | 3/2009 | Pearce |
| 2009/0088233 A1 | 4/2009 | O'Rourke |
| 2009/0113448 A1 | 4/2009 | Smith |
| 2009/0118006 A1 | 5/2009 | Kelly |
| 2009/0137320 A1 | 5/2009 | Kimura |
| 2009/0209335 A1 | 8/2009 | Pearce |
| 2009/0253494 A1 | 10/2009 | Fitch |
| 2009/0280909 A1 | 11/2009 | McEniry |
| 2009/0318223 A1 | 12/2009 | Langridge |
| 2009/0325711 A1 | 12/2009 | Bronstein |
| 2010/0131864 A1 | 5/2010 | Bokor |
| 2010/0169800 A1 | 7/2010 | Lance |
| 2010/0173701 A1 | 7/2010 | Van Luchene |
| 2010/0173713 A1 | 7/2010 | Van Luchene |
| 2010/0203963 A1 | 8/2010 | Allen |
| 2010/0267450 A1 | 10/2010 | McMain |
| 2010/0304839 A1 | 12/2010 | Johnson |
| 2010/0306672 A1 | 12/2010 | McEniry |
| 2010/0312995 A1* | 12/2010 | Sung ............... G06N 3/006 715/757 |
| 2011/0092279 A1 | 4/2011 | Pilip |
| 2011/0131085 A1 | 6/2011 | Wey |
| 2011/0190063 A1 | 8/2011 | Kajii |
| 2011/0212762 A1 | 9/2011 | Ocko |
| 2012/0009997 A1 | 1/2012 | Youm |
| 2012/0010734 A1 | 1/2012 | Youm |
| 2012/0015736 A1 | 1/2012 | Vanbragt |
| 2012/0021823 A1 | 1/2012 | Youm |
| 2012/0021825 A1 | 1/2012 | Harp |
| 2012/0064968 A1 | 3/2012 | Youm |
| 2012/0094751 A1 | 4/2012 | Reynolds |
| 2012/0122552 A1 | 5/2012 | Youm |
| 2012/0190456 A1 | 7/2012 | Rogers |
| 2012/0315993 A1 | 12/2012 | Dumont |
| 2013/0225260 A1 | 8/2013 | Cudak |
| 2013/0252737 A1 | 9/2013 | Mescon |
| 2013/0260876 A1 | 10/2013 | Margalith |
| 2013/0266927 A1 | 10/2013 | Mann |
| 2013/0296046 A1 | 11/2013 | Mianji |
| 2014/0004955 A1 | 1/2014 | Nahari |
| 2014/0004960 A1 | 1/2014 | Soti |
| 2014/0011595 A1 | 1/2014 | Muller |
| 2014/0024445 A1 | 1/2014 | Aller |
| 2014/0162763 A1 | 6/2014 | Kim |
| 2014/0162781 A1 | 6/2014 | Butler |
| 2014/0274402 A1 | 9/2014 | Michel |
| 2014/0342808 A1 | 11/2014 | Chowdhary |
| 2014/0344725 A1 | 11/2014 | Bates |
| 2014/0349753 A1 | 11/2014 | Lmai |

(56) References Cited

U.S. PATENT DOCUMENTS

| | | | |
|---|---|---|---|
| 2015/0031426 A1 | 1/2015 | Alloway | |
| 2015/0038233 A1 | 2/2015 | Rom | |
| 2015/0051000 A1 | 2/2015 | Henn | |
| 2015/0310698 A1 | 10/2015 | Polis | |
| 2016/0001181 A1 | 1/2016 | Marr | |
| 2016/0001182 A1 | 1/2016 | Marr | |
| 2016/0001186 A1 | 1/2016 | Marr | |
| 2016/0005270 A1 | 1/2016 | Marr | |
| 2016/0067611 A1 | 3/2016 | Ware | |
| 2016/0067612 A1 | 3/2016 | Ntoulas | |
| 2016/0166935 A1 | 6/2016 | Condrey | |
| 2016/0191671 A1 | 6/2016 | Dawson | |
| 2016/0296840 A1 | 10/2016 | Kaewell | |
| 2017/0206797 A1* | 7/2017 | Solomon | G06N 3/006 |
| 2017/0279719 A1 | 9/2017 | Faith | |
| 2018/0169515 A1 | 6/2018 | Rice | |
| 2018/0280806 A1 | 10/2018 | Otomo | |
| 2018/0308473 A1* | 10/2018 | Scholar | A63F 13/00 |
| 2019/0043239 A1* | 2/2019 | Goel | G06T 13/205 |
| 2019/0081848 A1 | 3/2019 | Zou | |
| 2019/0118078 A1 | 4/2019 | Li | |
| 2019/0126150 A1 | 5/2019 | Tartaj | |
| 2019/0164007 A1* | 5/2019 | Liu | G06F 18/2413 |
| 2019/0184286 A1* | 6/2019 | Du | A63F 13/67 |
| 2019/0197402 A1* | 6/2019 | Kovács | G06N 3/04 |
| 2019/0205727 A1* | 7/2019 | Lin | G06Q 40/04 |
| 2019/0295306 A1* | 9/2019 | Weston | A63F 13/56 |
| 2019/0340419 A1* | 11/2019 | Milman | G06N 3/088 |
| 2020/0122038 A1* | 4/2020 | Ebrahimi | A63F 13/67 |
| 2020/0122040 A1* | 4/2020 | Juliani, Jr. | G06N 20/00 |
| 2020/0145615 A1* | 5/2020 | Seko | G06N 20/00 |
| 2020/0372400 A1* | 11/2020 | Carreira-Perpiñán | G06F 16/9027 |
| 2020/0401576 A1* | 12/2020 | Yerli | G06T 15/205 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 1207694 A2 | 5/2002 |
| EP | 1209849 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | H11191097 A | 4/1999 |
| JP | 11191097 | 7/1999 |
| JP | 3033956 B2 | 4/2000 |
| JP | 3124916 B2 | 1/2001 |
| JP | 2001119403 A | 4/2001 |
| JP | 3177221 B2 | 6/2001 |
| JP | 2001204973 A | 7/2001 |
| JP | 3199231 B2 | 8/2001 |
| JP | 2001230883 A | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 2004062539 A | 2/2004 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5550720 B2 | 7/2014 |
| JP | 2015002839 A | 1/2015 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| WO | 0060444 A1 | 10/2000 |
| WO | 0062231 A1 | 10/2000 |
| WO | 0137162 A2 | 5/2001 |
| WO | 0201455 A2 | 1/2002 |
| WO | 0203645 A2 | 1/2002 |
| WO | 2002073457 | 9/2002 |
| WO | 20020087156 | 10/2002 |
| WO | 03044755 A1 | 5/2003 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Hassen et al., "A Task-and Data-Parallel Programming Language Based on Shared Objects," ACM Transactions on Programming Languages and Systems, vol. 20, No. 6, Nov. 1998, pp. 1131-1170.

Y. Zhao et al., "A 3D virtual shopping mall that has the intelligent virtual purchasing guider and cooperative purchasing functionalities", CSCWD 2004—8th International Conference on Computer Supported Cooperative Work in Design—Proceedings, 2004, p. 381-385.

V. Stojanovic, "Virtual boutique—try clothes on-line", 5th International Conference on Telecommunications in Modern Satellite, Cable and Broadcasting Service. TELSIKS 2001. Proceedings of Papers (Cat. No. 01EX517), 2001, pt. 2, p. 802-3 vol.2.

Kautz, H., B. Selman, M. Shah.. "Referral Web: Combining Social Networks and Collaborative Filtering". Communications of the ACM, vol. 40, No. 3, Mar. 1997.

Schwartz, M. F., D. C. M. Wood. "Discovering shared interests among people using graph analysis of global electronic mail traffic". Department of Computer Science, University of Colorado, Boulder CO, Oct. 1992.

(56) References Cited

OTHER PUBLICATIONS

Wellman, B. "For a social network analysis of computer networks: a sociological perspective on collaborative work and virtual community". Proceedings of the 1996 conference on ACM SIGCPR/SIGMIS. 1-11.
Qureshi, S. "Supporting electronic group processes: a social perspective". Proceedings of the 1995 ACM SIGCPR Conference on Supporting teams, groups, and learning inside the IS function. ACM Press. 24-34.
Ackerman, M.S., B. Starr. "Social activity indicators: interface components for CSCWsystems". Proceedings of the Sth ACM Symposium on User Interface and Software Technology. ACM Press. 159-168, Nov. 14-17, 1995.
Garton, L., C. Haythornthwaite, B. Wellman. "Studying on-line social networks in Doing Internet Research", Jun. 1997.
Srivastava, Jaidepp, Robert Cooley, Mukund Deshpande, Pang-Ning Tan. "Web Usage Mining: Discovery and Applications of Usage Patterns from Web Data". SIGKDD Explorations, vol. 1, Issue 2. Jan. 2000. 12-23.
Wang, Y. "Web Mining and Knowledge Discovery of Usage Patterns". CS748T Project (Part I) Feb. 2000.
Sack, W. "Conversation Map: a content-based Usenet newsgroup browser". Proceedings of the 2000 International Conference on Intelligent User Interfaces. ACM Press. 233-240.
Feldman, R. "Mining unstructured data". Tutorial notes for ACK SIGKDD 1999. ACM Press. 182-236.
International Search Report as Published as WO2005/079538 in corresponding international application No. PCT/US2005/005550, dated Jul. 5, 2006.
IBM developer Works, OptimalGrid—autonomic computing on the Grid, James H. Kaufman; Tobin J. Lehman; Glenn Deen; and John Thomas, Jun. 2003.
IBM, Transcoding: Extending e-business to new environments, Britton et al., Sep. 22, 2000.
Duong et al.; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp7arnumb- er=1266179.
"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297. Nov. 11, 2002.
Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.
Lee et al., "A Self-Adjusting Data Distribution Mechanism for Multidimensional Load Balancing in Multiprocessor-Based Database Systems," Information Systems vol. 19, No. 7, pp. 549-567, 1994.
Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.
Andert, "A Simulation of Dynamic Task Allocation in a Distributed Computer System," Proceedings of the 1987 Winter Simulation Conference, 1987, pp. 1-9.
Roaming Virtual World Is a Real Trip; [Final Edition] Leslie Walker. The Washington Post. Washington, D.C.: Mar. 30, 2006.
E-Entrepreneurship: Learning in a Simulated Environment Salim Jiwa, Dawn Lavelle, Arjun Rose. Journal of Electronic Commerce in Organizations. Hershey: Jul.-Sep. 2005. vol. 3, Iss. 3.
"Universally Unique Identifier", 2006 (http://en.wikipedia.org/wiki/UUID).
K. Loesing et al., "Privacy-aware presence management in instant messaging systems", Distributed & Mobile Syst. Group, Otto-Friedrich-Univ. Germany, Proceedings. 20th International Parallel and Distributed Processing Symposium Rhodes Island, Greece; (IEEE Cat. No. 06TH8860), 2006, 8 pp.

\* cited by examiner

SYSTEMS AND METHODS FOR GENERATING IMPROVED NON-PLAYER CHARACTERS

CROSS-REFERENCE

The present application relies on U.S. Patent Provisional Application No. 62/781,568, entitled "Systems and Methods for Generating Improved Non-Player Characters" and filed on Dec. 18, 2018, for priority.

FIELD

The invention relates generally to video games, and more particularly to systems and methods for styling generic non-player characters in video games based on behavior and actions of real players.

BACKGROUND

Multiplayer video games have exploded in popularity due, in part, to services such as Microsoft's Xbox LIVE® and Sony's PlayStation Network® which enable gamers all over the world to play with or against one another. Generally, a multiplayer video game is a video game in which two or more players play in a gameplay session in a cooperative or adversarial relationship. At least one of the players may comprise a human player, while one or more other players may comprise either non-player characters and/or other human players.

A non-player character ("NPC"), which may also be referred to as a non-person character, a non-playable character, a bot, or other similar descriptor, is a character in a game that is not controlled by a human player. In multiplayer video games, an NPC is typically a character controlled by a computer through artificial intelligence (AI).

Often times, when a player logs in to a game system or platform to play a multiplayer video game, the player may engage in a gameplay session in which he or she is matched with other players to play together (on the same team or as opponents). A given player may engage in multiple gameplay sessions during a login session. In addition, each gameplay session may be played with either the same or a different group of matched players.

In some instances, NPCs are used to fill gaps in a gameplay session. As an example, in a game that requires ten players to play together on a team, four NPCs may be selected to fill out the team if only six human players have joined. Sometimes the NPCs are generic in their characteristics. Sometimes the NPCs are programmed for different skills levels for use with players of matching skill levels. U.S. Pat. No. 10,118,099 entitled 'System and Method for Transparently Styling Non-Player Characters in a Multiplayer Video Game' and assigned to the Applicant of the present specification, describes systems and methods for "identifying, by the computer system, one or more human players to be matched for a gameplay session of a multiplayer video game, wherein each human player has a player profile comprising a number of profile attributes, wherein the human players are matched by grouping two or more players to play together in the gameplay session based on at least one of each player's profile attributes, game profile information, or match variables, and wherein the gameplay session requires a predetermined number of required players; determining, by the computer system, whether the predetermined number of players required for the gameplay session is met by the identified human players; obtaining, by the computer system, one or more non-player characters to fill available spots in the gameplay session responsive to a determination that the predetermined number of players required for the gameplay session is not met by the identified human players, wherein each of the one or more non-player characters has a non-player character player profile comprising a number of profile attributes; determining, by the computer system, a subset of profile attributes common to the identified human player profiles and the non-player character player profiles; and permitting, by the computer system, the display of only the determined subset of profile attributes when any identified human player profile or non-player character player profile is accessed."

U.S. Patent Application Publication Number US 2014/0342808, entitled 'System and Method of Using PCs as NPCs', describes virtual gameplay methods for "providing access to a video game in which a player can create a player character for interaction in the video game; allowing the player to play in the video game using the player character via at least one player character script; when the player exits the video game, allowing the player character to at least temporarily become a non-player character in the game by selectively causing the player character to assume at least one non-player character script, such that the player character has automatic, non-player directed interactions in the video game wherein the player character takes on the behaviour of a non-player character; and when the player returns to the video game, allowing the player character to resume play in the video game according to the player character script."

However, the currently available methods and systems that create and utilize NPCs to play with or on behalf of players are robotic and overly mechanized in nature, not providing the type of fluidity and creative interaction exhibited by human players. There is a need for NPC that may be more personalized not only in their appearance and presentation, but also in their gaming skills and ability to evolve those gaming skills. What is needed is systems and methods of generating NPCs that mimic the behavior of specific human players for enjoyment and business purposes, for example, NPCs mimicking the behavior of friends from online gaming sessions, and NPCs mimicking the behavior of famous and professional players to drive revenue and for practice sessions. What is also needed is a system for generating and implementing NPCs in a manner that allows them to evolve and develop, much like human players do.

SUMMARY

The following embodiments and aspects thereof are described and illustrated in conjunction with systems, tools and methods, which are meant to be exemplary and illustrative, and not limiting in scope. The present application discloses numerous embodiments.

The present specification is directed toward a computer implemented method for generating data representative of one or more non-player characters (NPCs) in one or more multi-player video games, the method being implemented in a host computer having one or more physical processors programmed with programmatic instructions that, when executed by the one or more physical processors, cause the host computer to perform the method, the method comprising: tracking one or more profiles of human players to generate human player data; tracking game data, wherein the game data is representative of one or more game events or game outcomes; generating data representative of a behavior of the NPCs by applying a neural network or machine learning process to the human player data and game data; and transmitting the data representative of the behavior of the NPCs to one or more servers hosting the one or more multi-player video games.

Optionally, the computer implemented method further comprises generating the data representative of the behavior of the NPCs substantially concurrently with at least one of the tracking of human player data or the tracking of game data.

The multi-player video games may be of a different genre, software platform, or type.

The data representative of the behavior of the NPCs may define one or more reactions of the NPCs to game events or a movement of the NPCs.

Optionally, the neural network or machine learning process comprises at least one of a linear regression process, a logistic regression process, a decision tree process, a naïve Bayes process, a k-means process, a random forest process, a dimensionality reduction process, a gradient boosting process, a supervised learning process, an unsupervised learning process, or a reinforcement learning process.

Optionally, the one or more servers comprise at least two and the multi-player video games are of a different genre, software platform, or type.

Optionally, the human player data comprises data representative of at least one of a method of playing, a skill level, reactions to one or more game events, or a visual appearance Optionally, the tracking of the human player data is triggered by a game score, a time left in a multi-player video game, or a game type.

Optionally, the human player data comprises at least one of an average speed, a weapon usage preference, a weapon in inventory, ammo in inventory, a frequency at which a player engaged an enemy at a first distance, a frequency at which a player fires a first shot in an engagement, a duration that a player spent in specific areas of a map of a game, a time to kill for each weapon type at each distance range, movement attributes, a proximity to teammates, a favorite skin, or emotes.

Optionally, the game data comprises game outcome data, an amount of time a game is played, an amount of virtual resources earned, lost, or exchanged, a score, a time of completion, a number of levels achieved, or metrics indicative of player engagement.

The present specification also discloses a system adapted to generate data representative of one or more non-player characters (NPCs) in one or more multi-player video games, wherein the system has one or more physical processors programmed with programmatic instructions that, when executed by the one or more physical processors, cause the host computer to: track one or more profiles of human players to generate human player data; track game data, wherein the game data is representative of one or more game events or game outcomes; generate data representative of a behavior of the NPCs by applying a neural network or machine learning process to the human player data and game data; and transmit the data representative of the behavior of the NPCs to one or more servers hosting the one or more multi-player video games.

Optionally, when executed by the one or more physical processors, the programmatic instructions are further configured to generate the data representative of the behavior of the NPCs substantially concurrently with at least one of the tracking of human player data or the tracking of game data.

The multi-player video games may be of a different genre, software platform, or type.

The data representative of the behavior of the NPCs may define one or more reactions of the NPCs to game events or a movement of the NPCs.

Optionally, the neural network or machine learning process comprises at least one of a linear regression process, a logistic regression process, a decision tree process, a naïve Bayes process, a k-means process, a random forest process, a dimensionality reduction process, a gradient boosting process, a supervised learning process, an unsupervised learning process, or a reinforcement learning process.

Optionally, the one or more servers comprise at least two and the multi-player video games are of a different genre, software platform, or type.

Optionally, the human player data comprises data representative of at least one of a method of playing, a skill level, reactions to one or more game events, or a visual appearance Optionally, when executed by the one or more physical processors, the programmatic instructions are further configured to be triggered to track the human player data by a game score, a time left in a multi-player video game, or a game type.

Optionally, the human player data comprises at least one of an average speed, a weapon usage preference, a weapon in inventory, ammo in inventory, a frequency at which a player engaged an enemy at a first distance, a frequency at which a player fires a first shot in an engagement, a duration that a player spent in specific areas of a map of a game, a time to kill for each weapon type at each distance range, movement attributes, a proximity to teammates, a favorite skin, or emotes.

Optionally, the game data comprises game outcome data, an amount of time a game is played, an amount of virtual resources earned, lost, or exchanged, a score, a time of completion, a number of levels achieved, or metrics indicative of player engagement.

The present specification is also directed toward a computer implemented method for modifying an existing non-player character in a multiplayer video game, the method being implemented in a host computer having one or more physical processors programmed with computer program instruction that, when executed by the one or more physical processors, cause the host computer to perform the method, the method comprising: tracking a player's profile, wherein the profile comprises at least one of information about a method of playing by the player, playing skill of the player, playing actions performed by the player, and appearance of the player; monitoring changes in the profile based on at least one factor; and modifying the existing non-player character according to the tracking and the monitoring to create a modified non-player character corresponding to the player.

Optionally, the method further comprises continuously tracking and monitoring and continually modifying the modified non-player character based on the continuous tracking and monitoring.

Optionally, the monitoring changes in the profile based on at least one factor comprises factors comprising at least one of a game score, time left in match, and a game type.

Optionally, the tracking the player's profile further comprises tracking from at least one game played by the player: at least one of an average speed, weapon usage preference, given weapons and ammo currently in inventory, frequency at which the player engaged given enemy distance, frequency at which the player fired the first shot in an engagement, duration that the player spent in specific areas of a map of a game, time to kill for each weapon type at each distance range, movement attributes, proximity to teammates, favorite skin, and emotes.

Optionally, the tracking and the monitoring is performed continuously from a start time, wherein the start time is one of a time of inception of a game, and a date defined by at least one of the player and the host computer.

The present specification also discloses a system for modifying an existing non-player character in a multiplayer video game, said system comprising: a host computer having one or more physical processors programmed with computer program instructions that, when executed, cause the host computer to: track a player's profile, wherein the profile comprises at least one of information about a method of playing by the player, playing skill of the player, playing actions performed by the player, and appearance of the player; monitor changes in the profile based on at least one factor; and modify the existing non-player character according to the tracking and the monitoring to create a modified non-player character corresponding to the player.

Optionally, the system is configured to plug into multiple game engines.

The claimed methods and systems improve the quality of generated NPCs by continually monitoring and logging human player attributes to be used to periodically adjust, in real-time, attributes of the generated NPCs, thereby providing an overall better gameplay experience.

The aforementioned and other embodiments of the present specification shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings.

DETAILED DESCRIPTION

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

Figure 1:
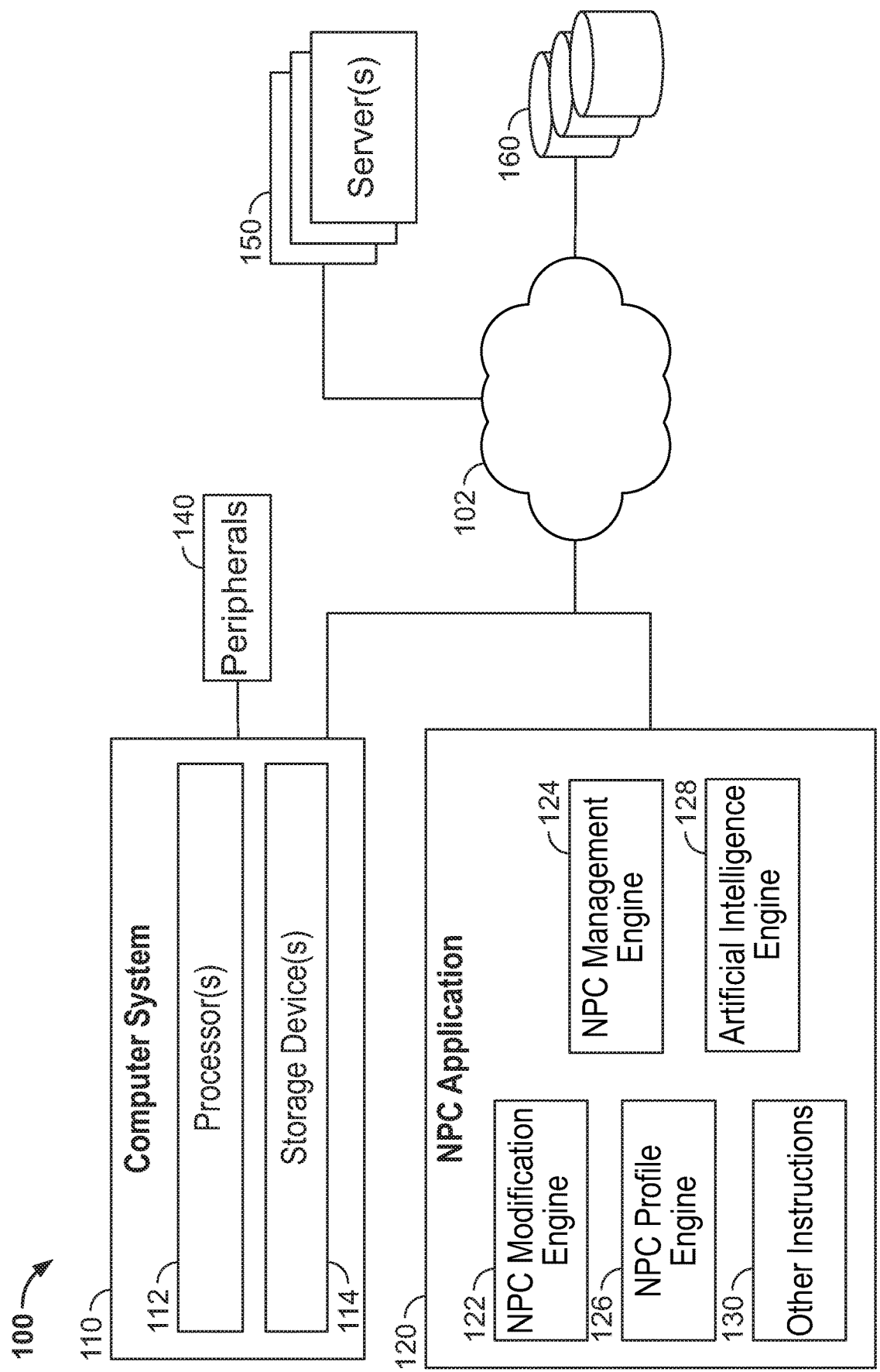
FIG. 1 illustrates an exemplary system environment for creating and using a non-player character, in accordance with some embodiments of the present specification.

FIG. 1 illustrates an exemplary system 100 architecture that includes at least one computer system 110, and may include one or more servers 150 and one or more databases 160, among other components, in accordance with some embodiments of the present specification.

Computer System 110

Computer system 110 may be configured as a gaming console, a handheld gaming device, a personal computer (e.g., a desktop computer, a laptop computer, etc.), a smartphone, a tablet computing device, and/or other device that can be used to interact with an instance of a video game.

Computer system 110 may include one or more processors 112 (also interchangeably referred to herein as processors 112, processor(s) 112, or processor 112 for convenience), one or more storage devices 114, one or more peripherals 140, and/or other components. Processors 112 may be programmed by one or more computer program instructions. For example, processors 112 may be programmed by an NPC application 120 and/or other instructions (such as gaming instructions used to instantiate the game).

NPC Application 120

Depending on the system configuration, NPC application 120 (or portions thereof) may be part of a game application, which creates a game instance to facilitate gameplay. Alternatively or additionally, NPC application 120 may run on a device such as a server 150 or a peripheral 140 to determine one or more NPC configurations for users in an "online" game hosted by server 150.

NPC application 120 may include instructions that program computer system 110. The instructions may include without limitation, an NPC modification engine 122, an NPC management engine 124, an NPC profile engine 126, an Artificial Intelligence ("AI") engine 128, and/or other instructions 130 that program computer system 110 and/or servers 150 to perform various operations, each of which are described in greater detail herein. As used herein, for convenience, the various instructions will be described as performing an operation, when, in fact, the various instructions program the processors 112 (and therefore computer system 110) and/or the server(s) 150 to perform the operation.

In one embodiment the NPC Application 120 is implemented on a server and comprises one or more application interfaces that are configured to receive, and transmit, data to at least one of a gaming server 150 hosting a multiplayer video game or a computing device 110 executing a video game. The multiple application interfaces in the NPC Application 120 may be configured to enable multiple different servers 150, each hosting a different multi-player video game, and/or multiple different computer systems 110, each executing the same or different video game clients, to directly and concurrently access the NPC Application. Accordingly, the NPC Application, which may be hosted on one or more servers, can provide the functionality described herein to multiple different video games, each of which is being hosted concurrently, thereby enabling the NPC Application to provide improved NPC generation to various multi-player gaming environments at the same time.

Peripherals 140

Peripherals 140 may be used to obtain an input (e.g., direct input, measured input, etc.) from a player. Peripherals 140 may include, without limitation, a game controller, a gamepad, a keyboard, a mouse, an imaging device such as a camera, a motion sensing device, a light sensor, a biometric sensor, and/or other peripheral device that can obtain an input from a player. Peripherals 140 may be coupled to a corresponding computer system 110 via a wired and/or wireless connection.

Server 150

Server 150 may include one or more computing devices and may include one or more physical processors programmed by computer program instructions. For example, server 150 may include all or a portion of a multiplayer video game host.

Although illustrated in FIG. 1 as a single component, computer system 110 and server 150 may each include a plurality of individual components (e.g., computer devices) each programmed with at least some of the functions described herein. In this manner, some components of computer system 110 and/or server 150 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein and processed by processor 112 may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other figures, different numbers of entities than those depicted may be used. Furthermore, according to various implementations, the components described herein may be implemented in hardware and/or software that configure hardware.

In embodiments, various databases 160 are configured to store multiple NPCs created and modified by NPC application 120. The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

During operation, NPC application 120 may track a player's play profile and continuously monitor the profile during the playing of a game by the player. Examples of player's play profile tracked and monitored is based on the game being played, and may include average speed, weapon usage, preference given for weapons and ammo currently in inventory, how often the player engaged given enemy distance, how often the player fired the first shot in an engagement, how much time a player spent in specific areas of the map, time to kill for each weapon type at each distance range, movement attributes (strafe, jump, run, walk, and crouch usage), proximity to teammates, cosmetic factors like favorite skin and emotes, among other attributes that distinguish the manner of playing by the player from other players.

An NPC modification engine 122 may modify an existing NPC corresponding to the player, according to the tracked and monitored data. In some embodiments, the data is map specific. In some embodiments, monitoring the data comprises monitoring the inter-relationship between the different attributes of the player's profile during game play. In one embodiment, monitoring the inter-relationship involves observing how the player's play profile changed based on game score, time left in match, and game type, among other factors. In some implementations, specific characteristics being analyzed could be across all levels/maps or specific to a level or map or even a portion of a level/map. In some implementations, the data could relate to how players interact with each other, use weapons/items, navigate through levels, react to attacks, or any other information that relates the player's play profile to various factors in the game.

In some embodiments, NPC application 120 tracks a single human player over time and NPC modification engine 122, independently, or in association with AI engine 128, generates an NPC to mimic the tracked human player. In some embodiments, the tracked human player is a high performing human player, or 'star' player. In other embodiments, NPC application tracks a plurality of human players in order to generate NPCs which share attributes with a large population of human players to provide for more evenly balanced gaming. In some embodiments, the plurality of human players being tracked comprise all human players in a game or a subset of human players in a game, wherein the subset may be based on attributes such as, but not limited to, level, skill, or playstyle. A larger subset of human players provides a greater data set to allow the system to discern general play patterns in the player groups being tracked. The NPC application 120 tracks the human players over a predetermined time period and game data is logged in the system. In some embodiments, the time period comprises since the beginning of the current game session, since the inception of the game (including all played game sessions), the past X months, wherein X ranges from 0 to 60 months and all increments within, and since the last time an update was performed to modify NPCs based on logged data.

NPC modification engine 122, in association with AI engine 128 or independently, uses these factors or logged data to modify the baseline artificial intelligence (AI) of the existing NPC and generate new NPCs, thus continuously improving the performance of the NPC(s) or changing a performance level to a level comparable with a performance level of one or more human players competing with or against the NPC(s). Accordingly, a reaction time of the NPCs, how the NPC reacts to one or more specific events, the choice the NPC may make in response to one or more game options, and certain other NPC traits may evolve or change based on human player profile data or game data. In embodiments, changing a performance level of an NPC comprises decreasing a performance level of an NPC to match or be in range with the performance level of at least one lower skilled human player or increasing a performance level of an NPC to match or be in range with the performance level of at least one higher skilled human player. In some embodiments, the existing NPC is a generic or a default NPC generated by NPC application 120 and available from database(s) 160, and which may be deployed in any game engine executed on system 110. An original or default NPC may also be referred to as a baseline NPC that is continuously developed based on the player's play profile to improve its performance in tune with the player's performance.

NPC modification engine 122 and AI engine 128 may also correlate player's play profile and game profile information in order to evolve the NPC(s). The game profile information for all the types of games played by the player, such as games provided by different game engines, may be used by NPC modification engine 122 for its purpose. In one implementation, a game profile may be generated for a gameplay session based on gameplay information. Gameplay information may describe various game characteristics of a gameplay session that may influence the quality of gameplay. For example, gameplay information may include, without limitation, a number of players, types of roles (e.g., snipers), types of in-game items used or purchased (e.g., weapons, vehicles, armor, custom suits, custom paint, tires, engine modifications, etc.), composition of teams (e.g., number and/or types of roles in each team), maps or game levels played (e.g., battle zones, racetracks, sporting arenas, etc.), duration of gameplay (e.g., how duration of a given gameplay session), player skill levels, player styles (e.g., aggressive, prefers to be a sniper, etc.), types of matches (e.g., team death match, capture the flag, etc.), and/or other information related to a gameplay session.

Figure 3:
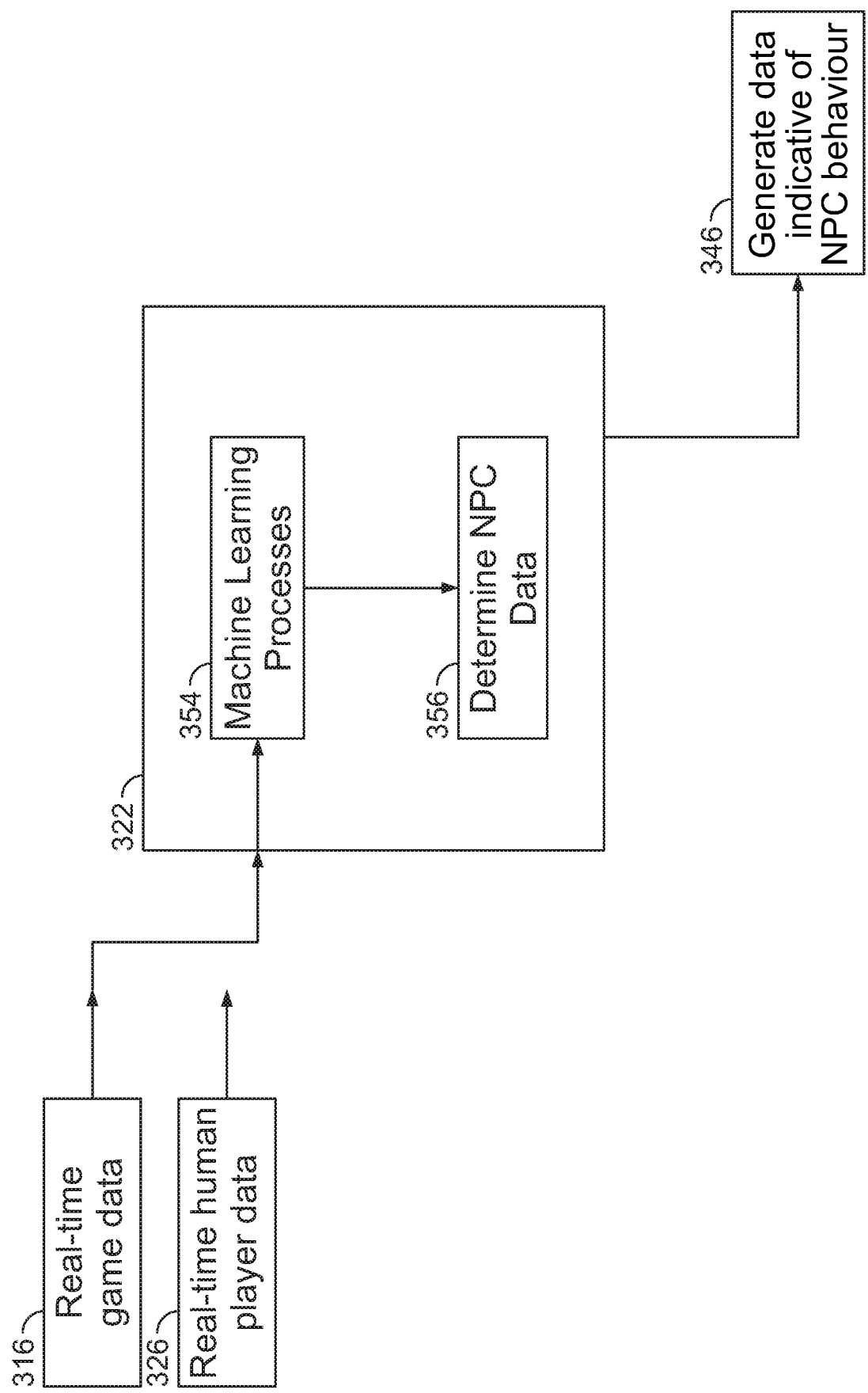
FIG. 3 is a schematic illustrating a process of applying a machine learning process to game data and/or human player data.

Accordingly, game outcomes may be used to modify one or more NPC behavioral or decision traits. In particular, AI engine 128 may be configured to associate, in real-time, specific game outcome data, such as an amount of time a game is played, an amount of virtual resources earned, lost, or exchanged, a score, a time of completion, a number of levels achieved, or other metrics indicative of engagement, with a reaction time of the NPCs, how the NPC reacts to one or more specific events, or the choice the NPC may make in response to one or more game options. To do so, AI engine 128 may comprise one or more nodes, virtually interlinked in a form of one or more layers, that is trained by providing one or more datasets having the game data or human profile data described above, wherein, as a result of the training process, one or more of the aforementioned nodes is associated with a coefficient, weight, or other value indicator used to weight the importance of the node and to associate inputted data, such as a game event, with a preferred behavior, such as how the NPC should react. In one embodiment, a training of the AI engine 128 occurs substantially concurrently with an execution of the AI engine 128 to identify, predict or otherwise select preferred NPC behavior based upon game events occurring within the game. Referring to FIG. 3, the AI engine 322 receives game data 316 and human player data 326 as described above. The AI engine 322 subjects the game data 316 and human player data 326 to one or more artificial engine or machine learning processes 354, including one or more of linear regression, logistic regression, decision trees, naïve Bayes, k-means, random forest, dimensionality reduction algorithms, gradient boosting algorithms, supervised learning, unsupervised learning, or reinforcement learning. In one embodiment the receipt of game data 316 and human player data 326 occurs at a different time or substantially concurrently with the generation of NPC data 346, which is indicative of how the NPC should behave, react, choose, or otherwise act, and/or the supply of the NPC data 346 to more than one server executing different games.

A game profile may be specific for a given gameplay session (e.g., different game profiles may be associated with different gameplay sessions) and/or may be used to generate a broader game profile for a particular game (e.g., different games may be associated with different game profiles). In this manner, a given game or gameplay session may be characterized using a game profile.

According to an aspect of the invention, the play profile may be generated for the player based on player information as well as play information from the game played by the player. Player information may describe various characteristics of the player, which may be used to assess how the player plays in a given gameplay session, a match, and/or a game.

For example, player information may comprise a variety of player attributes including, without limitation, screen name (or gamer tag), style of gameplay (e.g., aggressive), a role preference (e.g., an explicit indication by the player of such preference), a role actually played, a duration of gameplay sessions, a number of gameplay sessions played by in a given login session, in-game items used or purchased by the player, membership in a clan or team, preference to play with clan mates or friends, demographic information of the player (e.g., geographic location, gender, income level, etc.), win/loss records, scores, and/or other attributes or information without limitation that may be used to determine the play profile of the player in a given gameplay session, a match, and/or a game. Further, the play style of the player may be gathered from information about an average speed, use of weapons, preference given to certain weapons and ammo made available to the player, how often the player engaged given enemy distance, how often the player fired the first shot in an engagement, how much time the player spent in specific areas of a map of the game, time taken by the player to kill for each weapon type at each distance range, movement attributes of the player, proximity maintained by the player with the teammates, cosmetic attributes selected by the player for its playing character in the game, among other attributes or information that may be used to determine the play style of the player. While examples provided in the present specification are in context of FPS games, the attributes/information specific to any type of game may be determined by the various embodiments.

Information from a player play profile may be indexed by time. For example, the foregoing player information may include all player information known about a player, a subset of all information (e.g., information related to the last day, week, month, previous "N" number of game sessions, login sessions, etc.). In this manner, a player profile may relate to all-time gameplay of the player, recent gameplay of the player, time of day (e.g., a player may be associated with different player profiles at different times of the day, such as having an aggressive play style during evening hours and a more relaxed play style during morning hours), and/or other subset.

According to an aspect of the invention, a player play profile may include a numerical value or other metric representative of the player's overall player skill. A player skill value may, for example, be determined according to historical player performance data represented (or conveyed) by one or more player play profile attributes. For example, player play profile attributes such as number of games played, winning percentage, highest score, lowest score, and the like may be used to determine a player skill value. It should be appreciated that the number and type of player profile attributes used to determine a player skill value may vary depending on the type of video game. As an example, in a first-person-shooter game, numerical values associated with attributes such as Score Per Minute ("SPM"), Kill/Death Ratio ("KDR"), Win/Loss Ratio ("WLR"), or other attributes may be used to generate a player skill value for the player. The player skill value may be continually updated and stored over time.

In embodiments, the modified and improved NPC(s) are stored in database 160. NPC management engine 124 may select and retrieve one or more NPCs from database 160.

NPC management engine 124 may generate one or more modified NPCs in real-time ("on the fly") when a demand for the NPCs is identified. Alternatively, NPC management engine may generate the modified or improved NPC corresponding to the player in order to play with/against NPCs of other players. In some embodiments, NPC management engine 124 may license NPCs corresponding to popular players in order to generate value. In some embodiments, NPC management engine 124 uses improved NPCs to create simulated opposing teams/players for professional teams to practice with/against. In some embodiments, NPC management engine 124 replaces human players who left a game with NPCs that mimic the human player's play profile. In some embodiments, NPC management engine 124 uses modified and improved NPCs to develop new baseline NPCs in order to improve a quality of AI bots overall.

In some embodiments, NPCs created in NPC application 120 are styled by NPC profile engine 126 to resemble their corresponding human players in terms of both player profile attributes and gameplay actions such that players may not recognize NPCs as non-human, computer-controlled players. A variety of known computational and/or statistical methods may be used to ensure that an NPC is generated (for current gameplay or later selection) having attributes and attribute values typical of other human players in a gameplay session. Details about such methods are described in U.S. Pat. No. 10,118,099, entitled 'System and Method for Transparently Styling Non-Player Characters in a Multiplayer Vide Game', and incorporated herein by reference in its entirety.

During gameplay, AI engine 128 may control an NPC's behavior (including gameplay actions) such that the NPC's gameplay more closely mimics the gameplay of the corresponding player. In one implementation, AI engine 128 may analyze an NPC player play profile (as selected or generated in the manner described above) to determine an appropriate skill level of play of the NPC.

In one implementation, an NPC may be directed (or trained) by AI engine 128 to modify or improve its gameplay behavior corresponding to the changes in the player's gameplay behavior. AI engine 128 may monitor player and NPC gameplay performance in an effort to continually improve NPC performance, logic, strategy, and/or other NPC characteristics. In some implementations, the player's play profile is monitored over and over in multiple gameplay sessions, and AI engine 128 may fine tune the performance of the NPC each time so that it behaves in a manner more and more consistent with that of the player in its gameplay sessions. In this regard, NPC management engine 124 may, over time, have access to a plurality of NPCs (e.g., stored in database 160) that have been fine-tuned according to the play profile of each player. In implementations wherein a NPC is not saved or stored for later gameplay sessions, AI engine 128 may nonetheless fine tune one or more of the NPC's player profile attributes and save them in a template or model for later use by NPC management engine 124 and or NPC profile engine 126.

Figure 4:
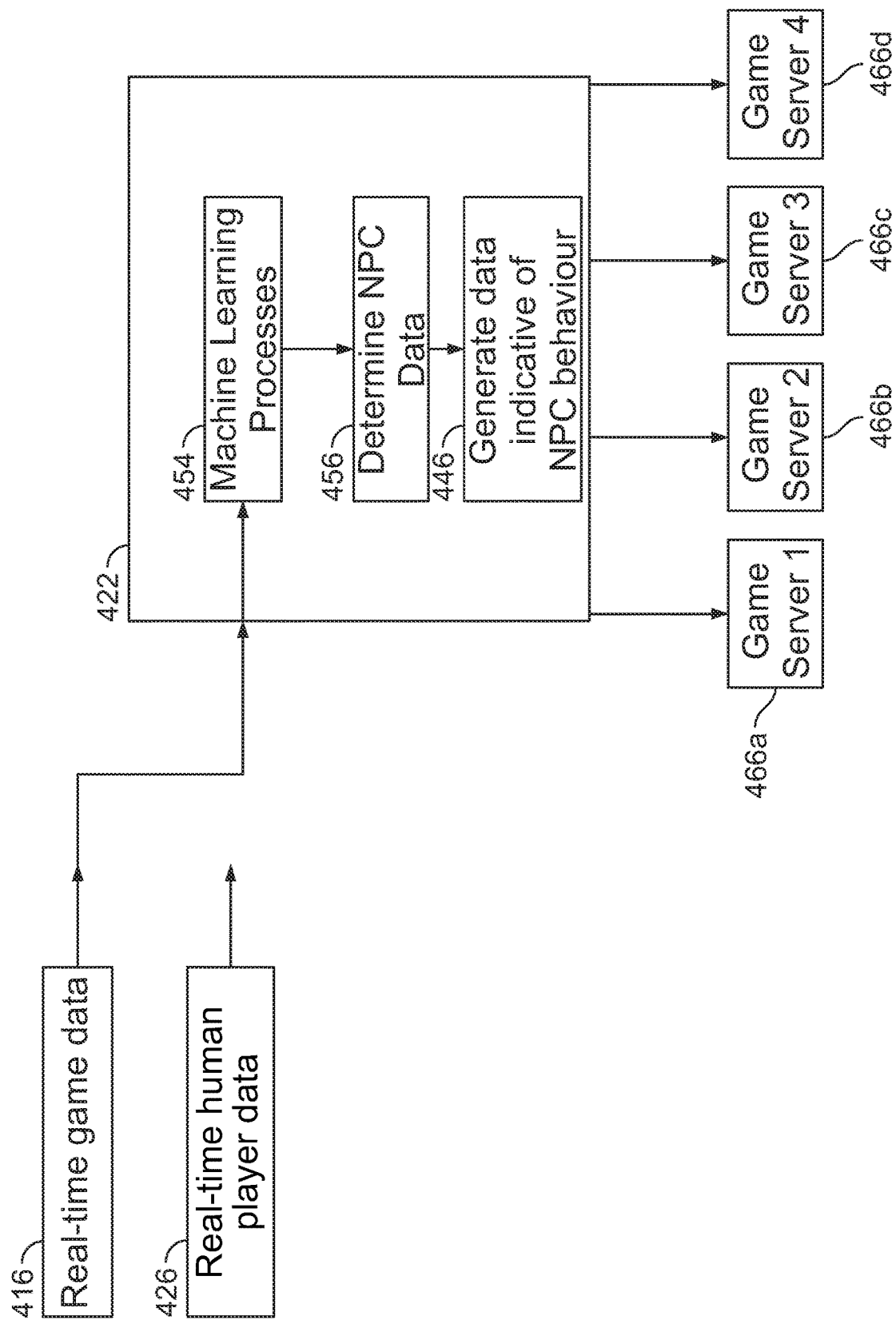
FIG. 4 is a schematic illustrating a process of applying a machine learning process to game data and/or human player data to generate NPC data and transmit it to more than one game server.

In embodiments of the present specification the NPC application 120 is configured as a standalone system component that may interface with multiple game engines. Referring to FIG. 4, the AI engine 422 receives game data 416 and human player data 426 as described above. The AI engine 422 subjects the game data 416 and human player data 426 to one or more artificial engine or machine learning processes 454, including one or more of linear regression, logistic regression, decision trees, naïve Bayes, k-means, random forest, dimensionality reduction algorithms, gradient boosting algorithms, supervised learning, unsupervised learning, or reinforcement learning. In one embodiment the receipt of game data 416 and human player data 426 occurs at a different time or substantially concurrently with the generation of NPC data 446, which is indicative of how the NPC should behave, react, choose, or otherwise act, and/or the supply of the NPC data 346 to more than one server executing different games. The NPC data 446 is then transmitted to one or more game servers 466*a*, 446*b*, 446*c*, 466*d* using application programming interfaces specific to game servers 466*a*, 446*b*, 446*c*, 466*d*. The NPC data 446, thereby enabling different game servers executing different games to share the resources of a common NPC generation system.

Figure 2:
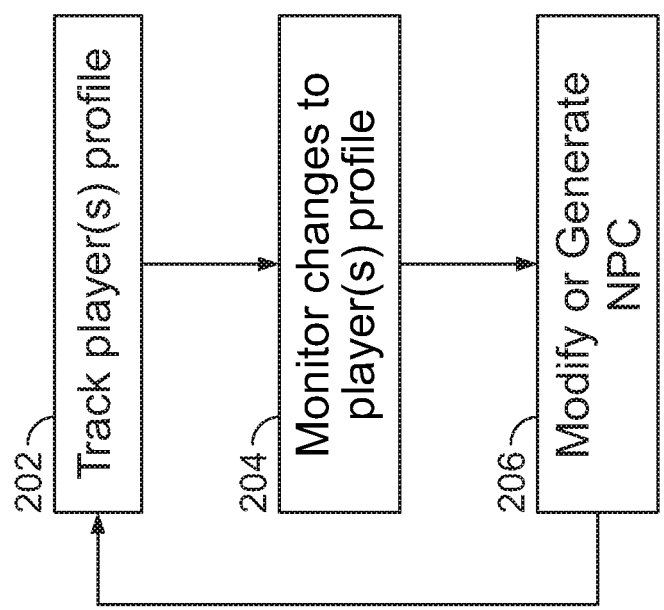
FIG. 2 is a flowchart illustrating an exemplary process for modifying a non-player character, in accordance with some embodiments of the present specification.

FIG. 2 illustrates an exemplary flow chart of processing operations for modifying existing NPCs or generating new NPCs in multiplayer video games, in accordance with some embodiments of the present specification. The various processing operations and/or data flows depicted in FIG. 2 are described in greater detail herein. The described operations may be accomplished using some or all of the system components (enabling all of the features and functionality) described in detail above and, in some implementations, various operations may be performed in different sequences and various operations may be omitted. Additional operations may be performed along with some or all of the operations shown in the depicted flow diagrams.

One or more operations may be performed simultaneously. Accordingly, the operations as illustrated (and described in greater detail below) are exemplary by nature and, as such, should not be viewed as limiting.

At 202, at least one player's play profile is tracked. The play profile may track user's play style, performance, skill levels, appearances, or any other information that determines the manner of play by the player. In some embodiments, multiple player's play profiles are tracked simultaneously. In embodiments, each play profile is tracked for the player across all the games played by the player.

At 204, the play profile is monitored for changes to the tracked play profile. The play profile may be monitored on a continuous basis to determine how various game-related factors such as and not limited to game score, time remaining in a match, type of game, and the like, affect the player's play profile. In embodiments, the play profile is monitored continuously from the time of inception of the first game played by the player. In some embodiments, the monitoring is initiated based on a trigger by the player or by NPC application 120, or any other external factor such as since last balance update, from a specific day or time. In some embodiments, the monitoring is performed for a specified period of time, for example a few months.

At 206, one or more NPCs corresponding to the player's play profile are modified in real time or generated by AI engine 128. Initially, in some embodiments, a baseline NPC assigned to the player is developed to mimic the play profile of the user. In some embodiments, the initial attributes of the NPC are not based on any tracked human player attributes and are rather default attributes provided by the game. In other embodiments, the initial attributes of the NPC are based on tracked attributes of a plurality of human players. In other embodiments, the initial attributes of the NPC are based on the attributes of a single tracked human player. Over the course of time and with the player's experience in gaming, the assigned NPC is further modified and improved based on the continuous monitoring performed at 204. According to some implementations, modifying comprises revising scripts that control NPCs. In an example, if player's play profile data indicates that the player generally reacts a certain way given a certain set of conditions, then the system can script the corresponding NPC to react the same way if those conditions arise.

Among multiple application of the embodiments of the present specification, an NPC customized according to a player is available to play in a video game in place of the player's character when the player exits the game, or is in some way not presently engaged in the video game. Therefore, embodiments of the present specification enable player characters to be used as NPCs, for a part of the game. Sometimes, embodiments enables player characters to be used as NPCs for all of the game. This is implemented in cases where the total number of players required are less than those available in the game.

While embodiments of the present specification are described in context of improving NPC performance based on and corresponding to a player's play profile, they may also be applicable to tracking and monitoring multiple players play profiles in order to improve the performance of at least one or more NPCs. In embodiments, a baseline set of NPCs are modified according to a larger data set of players in a game. So over some time period, the system can collect data about how human players actually play, and adjust NPC behavior to reflect the way humans actually play the game.

The various implementations may track and monitor all human players, a subset of human players based on game level, gaming skill, playstyle, or a particular human player such as a star player, or any other type of player specified within NPC application 120.

The above examples are merely illustrative of the many applications of the methods and systems of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A computer implemented method for generating data representative of one or more non-player characters (NPCs) in one or more multi-player video games, the method being implemented in a host computer having one or more physical processors programmed with programmatic instructions that, when executed by the one or more physical processors, cause the host computer to perform the method, the method comprising:
   using the host computer, monitoring gameplay sessions of the one or more multi-player video games, wherein the one or more multi-player video games comprises at least a first human player using a weapon in opposition to at least a second human player;
   using the host computer and based on said monitoring, generating human player data, wherein the human player data represents actions taken by two or more human players in the gameplay sessions of the one or more multi-player video games, wherein the two or more human players comprises at least the first human player and the second human player and wherein the human player data comprising a combination of a weapon usage preference, a frequency at which a player engaged an enemy at a first distance, a frequency at which a player fires a first shot in an engagement, a duration that a player spent in specific areas of a map of a game, and a proximity to teammates;
   using the host computer and based on said monitoring, generating game data, wherein the game data is representative of one or more game events or game outcomes in the one or more multi-player video games and wherein the game events or game outcomes represent interactions between the two or more human players;
   applying a neural network or machine learning process to the human player data and the game data;
   generating data representative of a behavior of the based on an output from the neural network or machine learning process, wherein the behavior of the NPCs comprises decreasing a performance level of the NPCs to be in range with a performance level of a human player or increasing the performance level of the NPCs to be in range with the performance level of the human player and wherein the data representative of the behavior of the NPCs is generated substantially concurrently with at least one of the generation of human player data or the generation of game data;
   transmitting the data representative of the behavior of the NPCs; and presenting the NPCs in the one or more video games based on the data representative of the NPCs.

2. The computer implemented method of claim 1, wherein the one or more multi-player video games are of different genres, software platforms, or types.

3. The computer implemented method of claim 1, wherein the data representative of the behavior of the NPCs defines one or more reactions of the NPCs to game events or a movement of the NPCs.

4. The computer implemented method of claim 1, wherein the neural network or machine learning process comprises at least one of a linear regression process, a logistic regression process, a decision tree process, a naïve Bayes process, a k-means process, a random forest process, a dimensionality reduction process, a gradient boosting process, a supervised learning process, an unsupervised learning process, or a reinforcement learning process.

5. The computer implemented method of claim 1, wherein the data representative of the behavior of the NPCs is transmitted to one or more servers, wherein the one or more servers comprise at least two and wherein the one or more multi-player video games are of different genres, software platforms, or types.

6. The computer implemented method of claim 1, wherein the human player data comprises data representative of at least one of a method of playing, a skill level, reactions to one or more game events, or a visual appearance.

7. The computer implemented method of claim 1, wherein the generation of the human player data is triggered by a game score, a time left in one of the one or more multi-player video games, or a game type.

8. The computer implemented method of claim 1, wherein the game data comprises game outcome data, an amount of time a game is played, an amount of virtual resources earned, lost, or exchanged, a score, a time of completion, a number of levels achieved, or metrics indicative of player engagement.

9. A system adapted to generate data representative of one or more non-player characters (NPCs) in one or more multi-player video games, wherein the system has one or more physical processors programmed with programmatic instructions that, when executed by the one or more physical processors, cause the host computer to:
monitor gameplay sessions of the one or more multi-player video games, wherein the one or more multi-player video games comprises at least a first human player using a weapon in opposition to at least a second human player;
generate human player data, wherein the human player data represents actions taken by two or more human players in the gameplay sessions of the one or more multi-player video games, based on said monitoring, wherein the two or more human players comprises at least the first human player and the second human players, and wherein the human player data comprises a combination of a weapon usage preference, a frequency at which a player engaged an enemy at a first distance, a frequency at which a player fires a first shot in an engagement, a duration that a player spent in specific areas of a map of a game, and a proximity to teammates;
generate game data, wherein the game data is representative of one or more game events or game outcomes in the one or more multi-player video games and wherein the game events or game outcomes represent interactions between the two or more human players;
apply a neural network or machine learning process to the human player data and the game data;
generate data representative of a behavior of the NPCs based on an output from the neural network or machine learning process, wherein the behavior of the NPCs comprises decreasing a performance level of the NPCs to be in range with a performance level of a human player or increasing the performance level of the NPCs to be in range with the performance level of the human player and wherein the data representative of the behavior of the NPCs is generated substantially concurrently with at least one of the generation of human player data or the generation of game data;
transmit the data representative of the behavior of the NPCs; and
present the NPCs in the one or more video games based on the data representative of the NPCs.

10. The system of claim 9, wherein the one or more multi-player video games are of different genres, software platforms, or types.

11. The system of claim 9, wherein the data representative of the behavior of the NPCs defines one or more reactions of the NPCs to game events or a movement of the NPCs.

12. The system of claim 9, wherein the neural network or machine learning process comprises at least one of a linear regression process, a logistic regression process, a decision tree process, a naïve Bayes process, a k-means process, a random forest process, a dimensionality reduction process, a gradient boosting process, a supervised learning process, an unsupervised learning process, or a reinforcement learning process.

13. The system of claim 9, wherein the data representative of the behavior of the NPCs is transmitted to one or more servers, wherein the one or more servers comprise at least two and wherein the one or more multi-player video games are of different genres, software platforms, or types.

14. The system of claim 9, wherein the human player data comprises data representative of at least one of a method of playing, a skill level, reactions to one or more game events, or a visual appearance.

15. The system of claim 9, wherein the generation of the human player data is triggered by a game score, a time left in one of the one or more multi-player video games, or a game type.

16. The system of claim 9, wherein the game data comprises game outcome data, an amount of time a game is played, an amount of virtual resources earned, lost, or exchanged, a score, a time of completion, a number of levels achieved, or metrics indicative of player engagement.

* * * * *